United States Patent [19]

Leveque

[11] Patent Number: 5,065,451
[45] Date of Patent: Nov. 12, 1991

[54] SYSTEM AND METHOD OF FREQUENCY CALIBRATION IN A LINKED COMPRESSION-EXPANSION (LINCOMPEX) SYSTEM

[75] Inventor: Howard Leveque, Columbia, Md.

[73] Assignee: AMAF Industries, Inc., Columbia, Md.

[21] Appl. No.: 363,863

[22] Filed: Jun. 9, 1989

[51] Int. Cl.⁵ .................... H04B 1/64; A03G 7/00
[52] U.S. Cl. ...................... 455/72; 455/337; 381/106; 333/14
[58] Field of Search .................... 381/30, 35, 106; 455/72, 337, 42, 43, 51, 47; 333/14

[56] References Cited

U.S. PATENT DOCUMENTS

| | | | |
|---|---|---|---|
| 4,250,470 | 2/1981 | Szarvas | 455/72 |
| 4,271,499 | 6/1981 | Leveque | 455/72 |
| 4,653,117 | 3/1987 | Heck | 455/260 |
| 4,893,347 | 1/1990 | Eastmond et al. | 455/72 |

FOREIGN PATENT DOCUMENTS 55-34580 3/1980 Japan ...................... 455/43

OTHER PUBLICATIONS

Russell, Program Lincompex, International Broadcasting Convention, Brighton, England (Sep. 20–23, 1980).
Cannon, Recording or Broadcasting Utilizing Automatic Gain Control Compressor, IBM Technical Disclosure Bulletin, vol. 10, No. 12, May 1968.

Primary Examiner—Reinhard J. Eisenzopf
Assistant Examiner—Lisa Charouel
Attorney, Agent, or Firm—Birch, Stewart, Kolasch & Birch

[57] ABSTRACT

A linked compressor-expander (Lincompex) circuit for use in telecommunications utilizes a frequency compensation circuit to frequency shift the total bandwidth of the whole communication channel to eliminate single side band "duck-talk" and data distortion in the transmitting of a complex waveform due to frequency drift or the detuning of the transmitter/receiver system. The demodulator includes an expander for expanding the compressed voice or data signal and a control tone conversion circuit for converting the received control tone into a frequency signal to be used by the expander. The control tone conversion circuit also determines the frequency error of a combination information waveform so that the frequency compensation circuit can carry out the proper frequency shifting process. A fading regulator is also provided to remove any audible level variations not removed by the automatic gain control circuitry in the receiver.

44 Claims, 8 Drawing Sheets

BANDWIDTH CHOSEN DEPENDS ON VARYING FACTORS INCLUDING ACCURACY OF COMPRESSION / EXPANSION DESIRED

SYSTEM AND METHOD OF FREQUENCY CALIBRATION IN A LINKED COMPRESSION-EXPANSION (LINCOMPEX) SYSTEM

FIELD OF THE INVENTION

The present invention relates to telecommunications systems in general, and more particularly, to the transmission of any combination information waveform such as that generated by voice or digital data using a linked compressor-expander (Lincompex) system.

BACKGROUND OF THE INVENTION

Linked compressor and expander (Lincompex) systems are well known in the telecommunications art. Such a digital Lincompex system is taught in U.S. Pat. No. 4,271,499 ('499) issued June 2, 1981, to Leveque, the Inventor of the present application. This Leveque patent '499 only teaches the transmitting of a voice signal over a Lincompex system. However, it has also been found that Lincompex systems can be utilized to transmit data having a complex waveform. Such a system that overcomes the inherent problem of data and envelope overlap (i.e., complex waveform) is fully disclosed in a co-pending application to Leveque, now U.S. Pat. No. 4,907,217, filed on Sept. 12, 1988, entitled "System and Method of Transmitting A Complex Waveform Over a Communication Channel Utilizing Lincompex Techniques".

In the voice transmission system, as disclosed in the Leveque U.S. Pat. No. '499, a voice signal is digitally transmitted using Lincompex techniques. This voice signal is band limited and exhibits an envelope 4 which is also band limited and does not overlap the voice band, (see FIG. 2(a)). An example of such a system is seen in FIG. 1 of the present application.

Figure 1A:
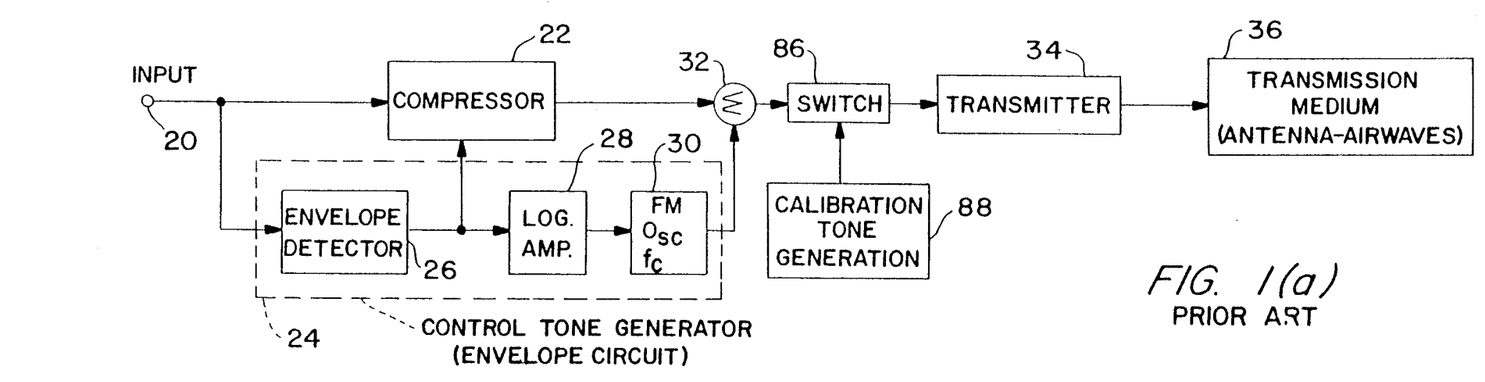
FIGS. 1(a) and 1(b) illustrate the transmitter and receiver sections of a prior art Lincompex system such as that described in the '499 Leveque U.S. Pat.

FIG. 1 of the present application illustrates a Lincompex system where voice information to be transmitted is introduced to an input 20 of the Lincompex system modulator as shown in FIG. 1(a). A control tone generator or envelope circuit 24 monitors the input voice signal. A compressor 22 compresses the introduced input voice signal. Compression is performed by dividing the signal by its envelope in pseudo-real time to produce a compressed voice signal. To develop the control tone, the system of FIG. 1(a) supplies the envelope signal developed from the output of the envelope detector 26 to a logarithmic (log) amplifier 28 which then develops a signal representative of the logarithm of the envelope signal. The output of this logarithmic amplifier 28 is supplied to a control terminal of a voltage control FM oscillator 30 which generates a frequency that varies about a center frequency $F_c$ in relation to the variation of the input voltage supplied to its control terminal from the logarithmic amplifier 28 to develop an envelope signal as an output of the control tone generator (envelope circuit) 24.

A summer 32 then sums the compressed voice signal developed at the output of the compressor 22 with the envelope signal developed at the output of the FM oscillator 30 to form a combined information signal.

In this speech transmission system, this combined information signal output from the summer 32 is provided to a transmitter 34 which transmits the signal over a desired transmission medium 36. In a typical embodiment, a single side band transmitter would normally transmit the modulated combined information signal across the airways in a known manner.

Figure 1B:
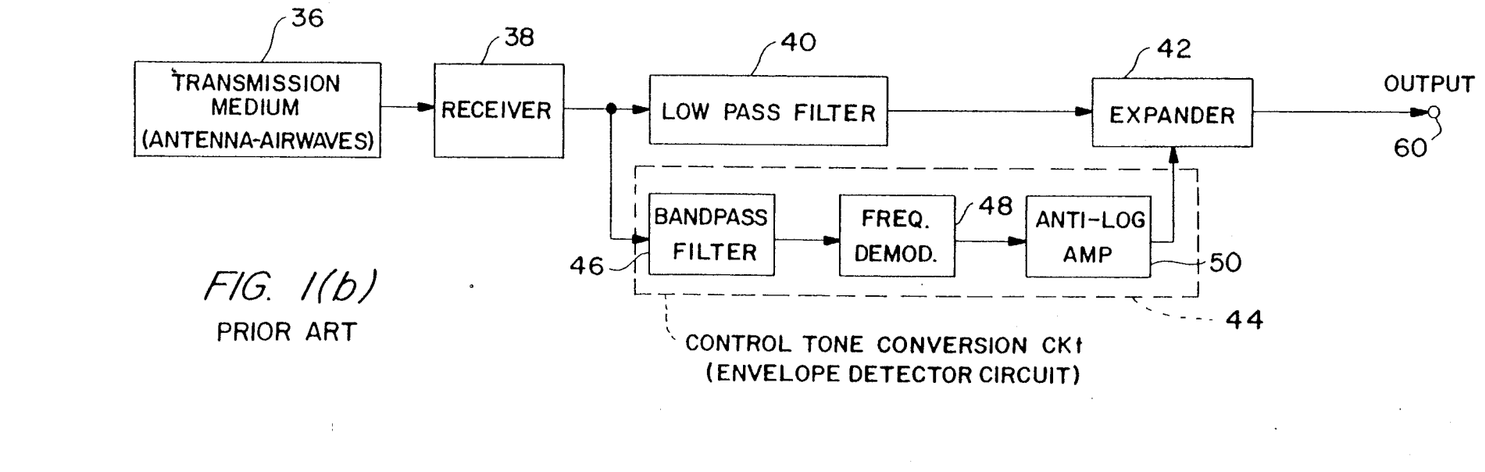

A conventional Lincompex demodulator is illustrated in FIG. 1(b). The demodulator receives the modulated combined information signal from the transmission medium 36, which normally includes an antenna for receiving radio waves from the atmosphere and supplying the received modulated combined information signal to a receiver 38 which demodulates the transmitted signal to reproduce the combined information signal. Typically, this receiver 38 would be a single side band receiver which mixes the received modulated combined information signal with the carrier frequency to reproduce at base band combined information signal. When transmitting voice, the combined information signal will exhibit the characteristics illustrated in FIG. 2(a).

Figure 2A:
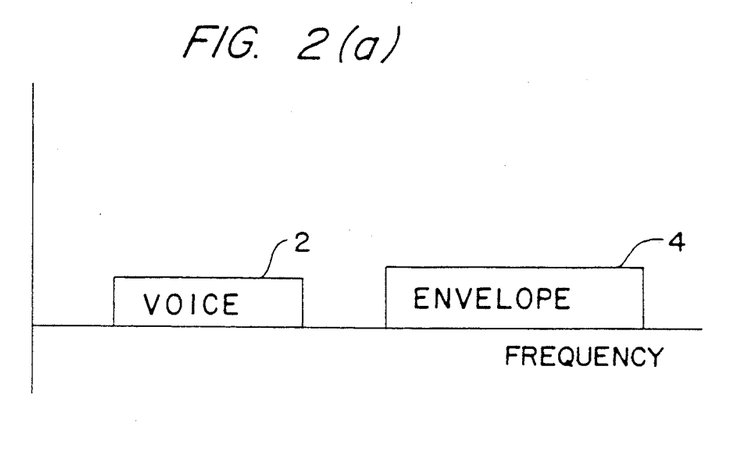
FIGS. 2(a) and 2(b) illustrate typical relationships between the frequency band of typical human voice and the modulated envelope of this voice and that which may be encountered by typical data and the frequency band of the data's envelope.

To recover only the voice from such a combined information signal, a low pass filter 40 removes the envelope information 4 of FIG. 2(a) from the combine information signal to recover the compressed voice signal containing only the voice information 2. This compressed voice information is transmitted according to the Lincompex techniques at a substantially constant syllabic peak voltage which enables substantially complete modulation of the transmitter 34 of FIG. 1(a). This information must then be expanded to produce the necessary dynamic range for the recovered voice signal to be supplied at the output 60. Accordingly, an expander 42 is utilized which essentially multiplies the compressed voice signal developed at the output of low pass filter 40 by the envelope signal which is recovered by a control tone conversion circuit 44.

The control tone conversion circuit 44 includes a band pass filter 46 which recovers only the envelope signal 4 of FIG. 2(a) from the combined information signal. This frequency modulated envelope signal originally developed by the FM oscillator 30 of FIG. 1(a) is then frequency demodulated by a frequency demodulator or discriminator 48 to recover the logarithm of the envelope. An anti-logarithm amplifier 50 is then utilized to recover the original envelope developed by the envelope detector 26 of FIG. 1(a). This original envelope signal is then used to recover the original voice signal by expanding the compressed voice signal via the expander 42 to provide the original signal to the output 60.

As demonstrated by the above-described system, a voice signal can be transmitted and received digitally using Lincompex techniques. However, this system has not been able to compensate for frequency drift or the detuning of the transmitter/receiver system. It is necessary that the center frequency between the transmitter and receiver are synchronized to ensure that the control tone and voice signal are not distorted upon reception.

During transmission of the voice signal, frequency drift or the detuning of the transmitter/receiver system can cause a communication problem with the reproduction of the voice signal. More specifically, the control tone used in the reproduction of the compressed voice signal is very sensitive to a change in the frequency, frequency drift. If the frequency of the control tone drifts due to various factors such as detuning of the transmitter/receiver system, (frequency drift of transmitter or receiver modulation oscillators), the power in the reproduced voice becomes weaker in proportion to this frequency change. In the typical Lincompex System, the relationship of the attenuation in the reproduced voice signal and the change in frequency is governed by the ratio 1db/2hz. For example, a 30 hz change or drift in frequency can cause a 15db error or attenuation in the reproduced voice signal. To resolve this problem of power attenuation, a conventional Lincompex System as shown in FIG. 3 utilizes a frequency compensation circuit which corrects the frequency of the incoming control tone such that the attenuation problem is substantially eliminated.

Figure 3:
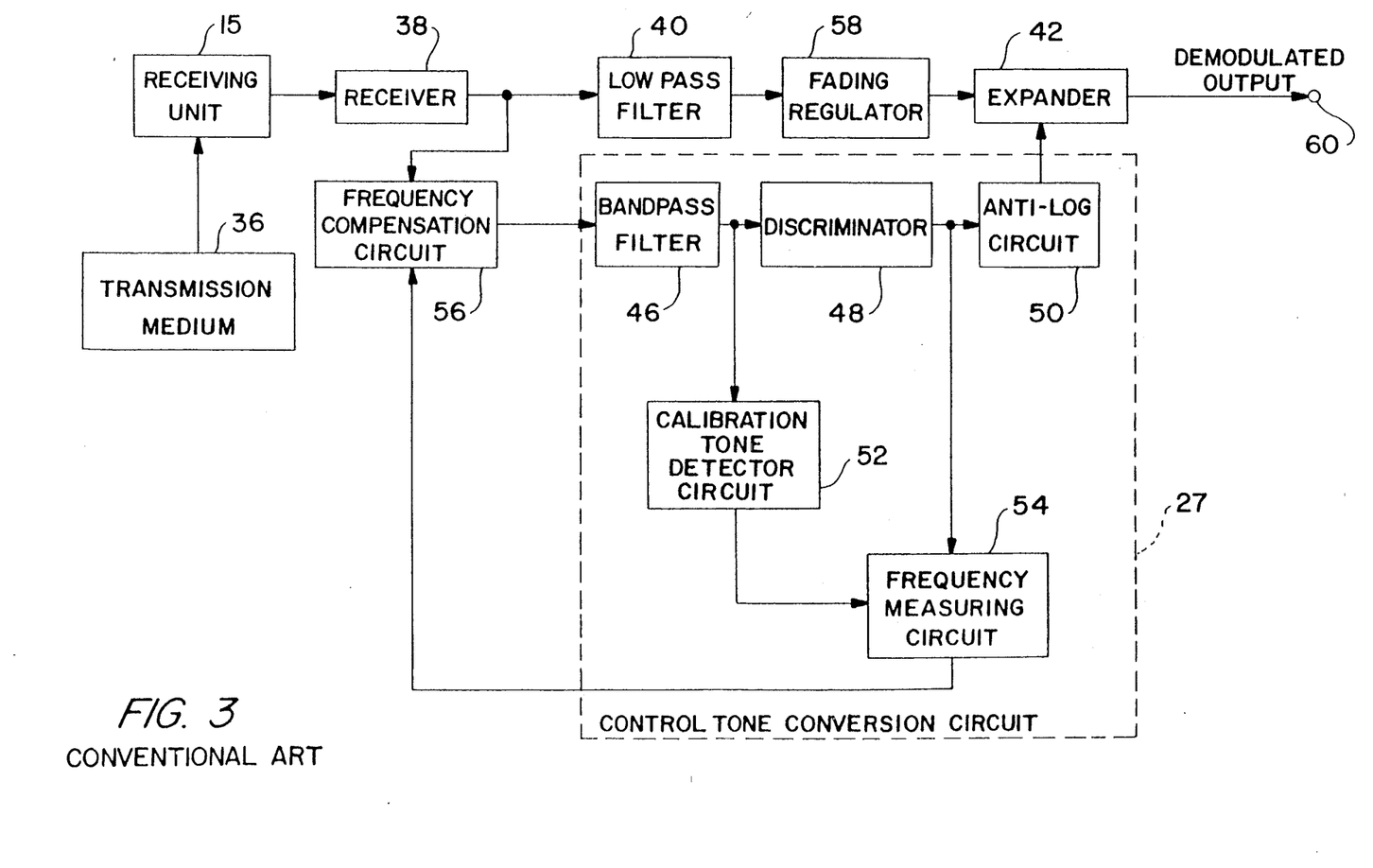
FIG. 3 illustrates a conventional Lincompex demodulator which overcomes the problem of power attenuation in the reproduced voice signal.

As illustrated in FIG. 3, a conventional Lincompex demodulator includes a receiving unit 15 which receives a modulated combined information signal from the transmission medium 36, which normally includes an antenna for receiving radio waves from the atmosphere, which supplies the received modulated combined information signal to a receiver 38. The receiver 38 demodulates the transmitted signal to produce a demodulated version of the combined information signal. Typically, this receiver would be a single side band receiver which mixes the received modulated combined information signal with the carrier frequency to produce a baseband combined information signal.

To recover only the voice signal from such a combined voice/envelope information signal, a low pass filter 40 removes the envelope information 2 of FIG. 2(a) from the combined information signal to recover the compressed voice signal containing only the voice information 1. This compressed voice signal is transmitted according to the Lincompex techniques at a substantially constant syllabic peak voltage which enables substantially complete modulation of the transmitter 34 of FIG. 2(a). The compressed voice signal is passed through a fading regulator 58. The fading regulator 58 is a fading regulator similar to the one described in U.S. Pat. No. '499 which removes any audio level variations not removed by the automatic gain control circuitry in the receiver 38. This compressed modified voice signal output from the fading regulator is then expanded to produce the necessary dynamic range for the recovered voice signal to be supplied at the output 60. Accordingly, an expander 42, similar to the one described in U.S. Pat. No. '499, is utilized which essentially multiplies the compressed modified voice signal developed at the output of the fading regulator 58 by an envelope signal which is recovered by a control tone conversion circuit 27.

The control tone conversion circuit 27 comprises a band pass filter 46 which recovers only the control tone which is represented by the envelope information signal 2 FIG. 2(a) from the combined information signal. The control tone originally developed by the FM oscillator 30 of FIG. 1(a) is then passed through a frequency discriminator 48. The frequency discriminator 48 measures the instantaneous frequency of the control tone and produces a voltage level representative of this measured frequency. In this case, the voltage level also represents the logarithm of the original envelope signal. The anti-logarithm circuit 50 is utilized to recover the original envelope signal. This logarithmic signal is then supplied to an anti-logarithm circuit 50. The anti-logarithm circuit 50 is utilized to recover the original envelope developed by the envelope detector 25 of FIG. 1(a). This original envelope signal is used by the expander 42 to recover the original voice signal by expanding the compressed voice signal to provide the original signal to the output 60. This control tone conversion circuit 27 is similar to the control tone conversion circuit described in the Leveque '499 U.S. Pat.

The control tone conversion circuit 27 also comprises a calibration tone detector circuit 52 and a frequency measuring circuit 54. The calibration tone detector circuit 52 detects the initial calibration tone transmitted by the transmitter to determine when the frequency of the calibration tone is to be compared with a reference frequency to determine a frequency error.

This calibration tone is generated by a calibration tone generation circuit located in the transmitter in a manner similar to the process disclosed in the Leveque '499 U.S. Pat. A typical calibration tone generator 88 of FIG. 1(a) includes an attenuator coupled to an output of a variable voltage divider. A switch 86 is also coupled to the digital compressor 22 and the calibration tone generator of a transmitter. The attenuator and the switch are operated to momentarily allow an unattenuated and unmodulated calibration signal, which in the preferred embodiment corresponds to the frequency of the control tone signal at a center frequency to be transmitted prior to the compressed voice signal, thereby generating the calibration tone for a period of 200 to 300 milliseconds. This signal is generated in this example each time the microphone is keyed, or as desired.

The calibration tone detector circuit 52 generates a control signal representing that a calibration tone has been received. The detection of the calibration tone utilizes the conventional method described in the Leveque '499 U.S. Pat. The frequency measuring circuit 54 receives this signal from the calibration tone detector circuit 52 and compares this signal representative of the frequency of the calibration tone as generated by the discriminator 48 with the desired standard frequency, i.e., the intended control tone center frequency. If a difference in the frequencies is determined, the frequency measuring circuit 54 recognizes that a frequency error is present and generates a frequency error signal, a voltage in the preferred embodiment, which is stored and used by a frequency compensation circuit 56 so that the frequency compensation circuit 56 can correctly frequency translate the frequency of the control tone. The above frequency error determination can be implemented using software techniques.

Figure 8A:
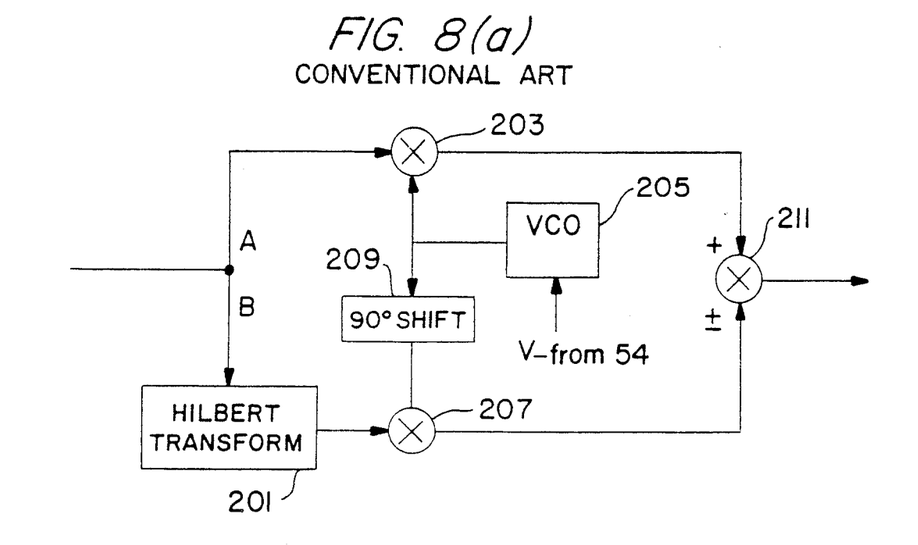
FIG. 8(a) illustrates an example of the frequency compensation unit used in the conventional Lincompex System as shown in FIG. 3 and utilizable in a preferred embodiment of the present invention.

An example of the frequency compensation circuit 56 is a typical phase shifting circuit or frequency translator as shown in FIG. 8(a). These circuits usually include a Hilbert Transform Circuit, an oscillator, phase shifter, multipliers, and a summer. In this example, (as shown in FIG. 8(a)), the signal path is split into two paths, A and B. Path A is connected to a multiplier 203. Connected to multiplier 203 is a voltage controlled oscillator 205 and a summer 211. The voltage controlled oscillator 205 is also connected to a 90° phase shifting device 209. Furthermore, Path B is connected to a Hilbert Transform Circuit 201. Connected to the Hilbert Transform Circuit 201 is a multiplier 207. This multiplier 207 is connected to the 90° phase shifting device 209 and the summer 211. The summer is connected to the input of the Lincompex demodulator.

An incoming signal is split into two paths, A and B. The signal traveling along path A is modulated, multiplied, by multiplier 203, with a cosine waveform type signal generated by the voltage controlled oscillator 205. The frequency of this cosine signal is determined according to the frequency error measured in the frequency measuring circuit 54 with a range between 0 to 100 Hz. The modulated signal from multiplier 203 is supplied to summer 211 to be added with a signal modified along path B.

The signal traveling along path B is first passed through a Hilbert Transform Circuit 201 which shifts the positive frequency components of the signal by −90° and shifts the negative frequency components of the signal by +90°. After being transformed by the Hilbert Transform Circuit 201, the signal is modulated, multiplied, by multiplier 207, with a sine waveform type signal. This sine signal is a 90° shifted version of the cosine signal generated by the voltage controlled oscillator 205. The frequency of this sine signal is equal to the frequency of the cosine signal. The modulated signal is supplied to the summer 211 so that its negative and positive components can be summed with the modulated signal of path A. The signal generated by the summer 214 is a frequency compensated signal to be used by the Lincompex demodulator.

Figure 8B:
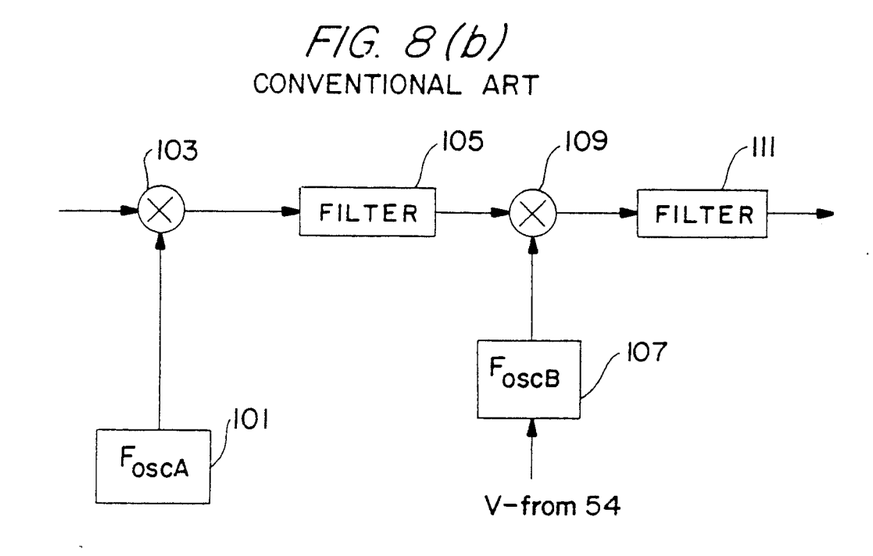
FIG. 8(b) illustrates an example of the frequency compensation unit used in the conventional Lincompex system as shown in FIG. 3 and utilizable in a preferred embodiment of the present invention.

Another example of the frequency compensation circuit 56 is a typical frequency shifting circuit or frequency translator as shown in FIG. 8(b). These circuits usually include oscillators, multipliers, and filters. In this example, (as shown in FIG. 8(b)), a multiplier 103 receives the incoming signal. The multiplier 103 is connected to a first frequency compensator oscillator 101 and a first filter 105. The first filter 105 is connected to a multiplier 109. Connected to multiplier 109 is a second frequency compensator oscillator 107 and a second filter 111. The second frequency compensator oscillator 107 is connected to the frequency measuring circuit 54. The second filter 111 is also connected to the input of the Lincompex demodulator.

A first frequency compensator oscillator 101 produces a frequency corresponding to a first frequency which is greater than the bandwidth of the signal being shifted, necessary to prevent the problem of overlap of the two side band signals which occur when the signal is multiplied by a frequency less than the bandwidth of the signal. For example, if the bandwidth of the combination information signal is 3000 Hz, it might be desirable to set the frequency $F_{OSCA}$ of the first frequency compensation oscillator 101 at 9000 Hz. The output of the first frequency compensation oscillator 101 is mixed with the combination information signal within a first frequency compensation mixer 103 and the lower sideband is filtered by a frequency compensation highpass filter 105 which removes the lower sideband produced by mixing the $F_{OSCA}$ with the combined information signal using mixer 103 to develop a frequency raised combination information signal. A second frequency compensation oscillator produces a frequency $F_{OSCB}$ which corresponds to the first frequency minus the frequency change. For example, if the control tone must be raised 12 Hz, the second frequency compensation oscillator 107 generates a frequency $F_{OSC2} = F_{OSC1} - 12$, which is multiplied with the frequency raised combination information signal using a second frequency compensation mixer 109. This time a frequency compensation low pass filter 111 is used to remove the upper sideband, thereby raising (or lowering) the frequency of the combination information signal by the frequency error in this example, 12 Hz. In this conventional Lincompex System, the second frequency compensation oscillator 107 is a voltage controlled oscillator, thus producing a second frequency in accordance with the voltage level of the control signal received from the frequency measuring circuit 54.

Although the conventional Lincompex System can substantially eliminate the power variation in the reproduced voice signal due to frequency drift or detuning of the control tone, the conventional Lincompex System is not able to correct frequency drift of the modulated speech or data itself. Thus, the conventional system encounters at least two other problems due to frequency drift or detuning of the transmitter/receiver system. One such problem is commonly referred to as "duck-talk". This is caused by the voice signal being offset in frequency due to the frequency drift. The offset results in a distortion in the voice signal which creates a voice signal sounding like a duck, thus the name "duck-talk".

Another problem associated with frequency drift or the detuning of the transmitter/receiver is the distortion of the received data signals when data is transmitted. In a typical Data System to ensure proper reception of the data with the fewest number of errors, the filters used to obtain the data signal are as narrow as possible. This narrow banded aspect realizes, for a given transmission rate, fewer errors. However, if the frequency of the transmitted signal drifts or the transmitter/receiver system becomes detuned, a frequency error will occur, causing a portion of the data band signal to fall outside the narrow bandwidth of the receiving demodulator filters. In other words, the frequency error causes the data to becomes distorted, thereby destroying the quality of the data transmission.

While conventional Lincompex techniques allow the transmission of voice signals and can eliminate the power variation problem with respect to signal transmission, the conventional Lincompex Systems are not able to transmit a signal without the problem of "duck-talk" with respect to the voice signal and without data distortion due to frequency drift.

SUMMARY OF THE PRESENT INVENTION

The above-mentioned problems of utilizing prior art Lincompex techniques to transmit a combination information waveform, such as voice/envelope signal are also encountered when using Lincompex techniques to transmit complex waveforms, such as a data/envelope signal, as described hereinbelow and in detail in the now U.S. Pat. No. 4,907,217 as mentioned above. The above-mentioned undesired problems concerning transmission of voice signals and data signals should then desirably be eliminated. Distortions related to frequency drift may then also be overcome by virtue of the concepts of the present invention whereby any voice signal or complex waveform may be transmitted over a communication channel utilizing Lincompex techniques. According to the teachings of the present invention, the frequency of the received voice or data signal is corrected along with the correction of the frequency of the control tone to prevent the occurrence of "duck-talk" and to substantially eliminate distortion in the transmitting of a complex waveform due to frequency drift.

According to the teachings of one embodiment of the present invention, the received combination information waveform is frequency corrected prior to the splitting of the combination information waveform into a voice or data signal and control tone. The frequency correction is to ensure that the received combination information waveform does not become detuned or drift from the transmission channel frequency. In this system, the frequency of the received combination information waveform is frequency shifted in response to signals received by a frequency measuring circuit which monitors the frequency of the received calibration tone to determine the frequency error which is due to the combined effects of the transmitter and receiver. Upon detection of a frequency change, the frequency measuring circuit produces a signal which is stored and utilized in frequency shifting the combination information waveform to match the transmission channel frequency being (theoretically) used.

OBJECTS OF THE PRESENT INVENTION

It is an object of the present invention to develop a Lincompex system which ensures that frequency drift or the detuning of the transmitter/receiver system does not affect the quality of the received signal.

It is another object of the present invention to develop a Lincompex System which compensates for frequency drift and the detuning of the transmitter/receiver system, thereby avoiding and substantially eliminating the phenomena of "duck-talk".

It is still another object of the present invention to develop a Lincompex System which compensates for frequency drift and the detuning of the transmitter/receiver system, thereby substantially eliminating data distortion in complex waveform transmission.

It is a further object of the present invention to develop a method for frequency compensating a received signal in response to frequency drift or the detuning of the transmitter/receiver that is compatible with existing Lincompex equipment.

It is a still further object of the present invention to achieve the above objects while also correcting the problem of frequency drift of the Lincompex control tone.

It is still further another object of the present invention to determine an error in frequency of the received signal and to retune the receiver instead of retuning the Lincompex demodulator.

These and other objects of the present invention will become more readily apparent from a better understanding of the preferred embodiments described below with reference to the following drawing Figures.

BRIEF DESCRIPTION OF THE DRAWINGS

The present invention will become more fully understood from the detailed description given below and the accompanying drawings which are given by way of illustration only and are not intended to limit the present invention, and wherein.

The above-mentioned drawings will be described in detail in the following detailed description.

DETAILED DESCRIPTION OF THE PREFERRED EMBODIMENTS

The present invention will be described with reference to a general description of Lincompex techniques which may be implemented digitally or otherwise. However, the preferred embodiments contemplate the use of digital Lincompex techniques to practice the teachings of the present application. Accordingly, to the extent necessary, the Applicant hereby incorporates by reference the entirety of the disclosure of U.S. Patent 4,271,499 entitled "Method and Apparatus for Digitally Implementing a Linked Compressor-Expander Telecommunications System" invented by the Inventor of the present application, and the entirety of the now U.S. Pat. No. 4,907,217, filed on Sept. 12, 1988, entitled "System and Method of Transmitting A Complex Waveform Over a Communication channel Utilizing Lincompex Techniques", invented by the Inventor of the present application into the specification of the present application.

Figure 5:
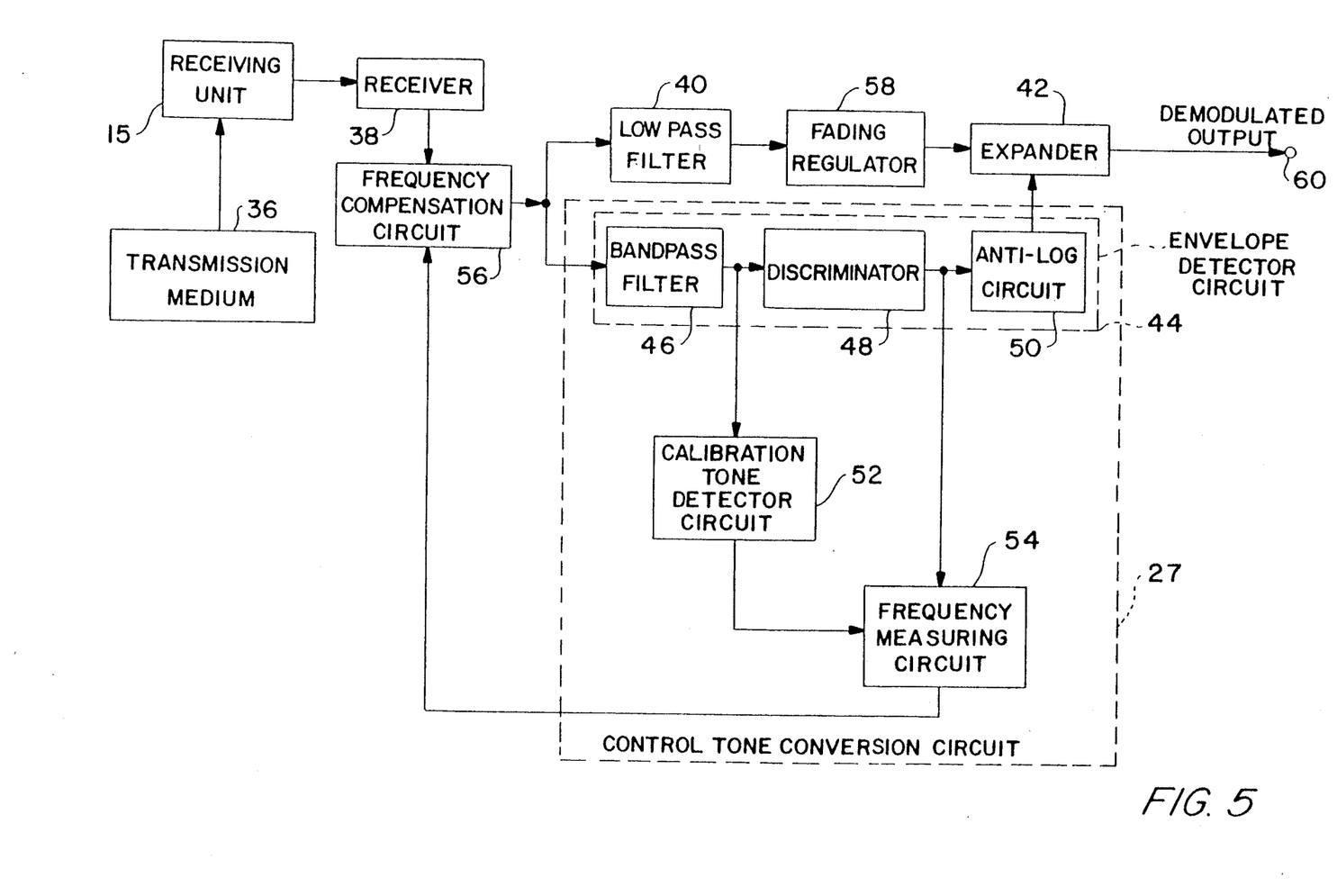
FIG. 5 illustrates one embodiment of a Lincompex receiver produce according to the teachings of the present invention with respect to the transmission/reception of a voice signal.

FIG. 5 illustrates one embodiment of the present invention where the Lincompex demodulator automatically frequency compensates the compressed combination information waveform by frequency shifting the total bandwidth according to a measured frequency error prior to the splitting of the combination information waveform into its components, a voice signal and the control tone, thereby substantially eliminating the occurrence of "duck-talk" in a voice signal.

The present invention compensates for frequency variations between the modulator and output of the demodulator through monitoring the control tone center frequency generated as a calibration tone in a manner similar to that described in the background of the present invention with respect to FIG. 3. A fixed frequency calibration tone is developed and detected by the calibration tone detector circuit 52 of the present invention in a manner also similar to the manner of detection of the calibrate tone detector circuit 52 of FIG. 3. It should be understood, however, that this calibrate tone can be transmitted in any desired fashion. While in a preferred embodiment, this calibrate tone is transmitted at the center frequency of the control tone as a constant frequency burst pattern for a predetermined time period, other frequencies could also be utilized. Additionally, in the digital data transmission embodiment described hereinbelow, the calibration tone can be transmitted, for example, each time the transmitter is seized by the source. The calibrate tone can also be transmitted periodically or in response to any known criteria.

In FIG. 5, as in all figures of the present application, like elements throughout the drawing figures are identified with like numbers.

To achieve the above result, this embodiment of the present invention contemplates, as shown in FIG. 5, a Lincompex demodulator comprising a frequency compensation circuit 56, a low pass filter 40, a bandpass filter 46, a fading regulator 58, an expander 42, a discriminator 48, a calibration tone detector circuit 52, a frequency measuring circuit 54, and an anti-log circuit 50.

The frequency compensation circuit 56 is connected to a conventional receiver 38 which is connected to a receiving unit 15 that normally includes an antenna. The receiving unit 15 receives the combination information waveform that has been transmitted by a transmitter. The frequency compensation circuit 56 is further connected to the low pass filter 40 and bandpass filter 46. The low pass filter 40 and bandpass filter 46 receive a frequency shifted version of the original transmitted combination information waveform from the frequency compensation circuit 56. Low pass filter 40 and bandpass filter 46 split the combination information waveform into a voice signal and a control tone, respectively. The voice signal is fed into the fading regulator 58 from low pass filter 40 to produce a modified voice signal After processing by the fading regulator 58, the modified signal is fed into the expander 42, where it is expanded back to its original form and outputted for utilization by the receiving device as previously described.

The control tone filtered from the combination information signal by bandpass filter 46 is fed into the discriminator 48 and the calibration tone detector circuit 52. The discriminator 48 and the calibration tone detector circuit 52 are similar to the discriminator and calibration tone detector described above as well as in the Leveque U.S. Pat. No. '499. If the control tone is detected to be a pattern of a constant frequency calibration tone, the calibration tone detector circuit 52 will detect this calibration tone using the conventional methods described above and in the Leveque '499 U.S. Pat. and produce a signal indicating that the calibration tone has been received. This signal will enable the frequency measuring circuit 54. During this detection of the calibration tone, the calibration tone is fed into the discriminator 48 which will produce a signal corresponding to the frequency of the calibration tone. The signal from the discriminator 48 is supplied to the frequency measuring circuit 54. The frequency measuring circuit 54 receives the signal from the discriminator 48 and an enabling signal from the calibration tone detector circuit 54. The enabling signal instructs the frequency measuring circuit 54 to use the signal of the discriminator 48 to determine the frequency of the transmitted calibration tone. The frequency of the transmitted calibration tone is then compared with a reference frequency, which in the preferred embodiment corresponds to the center frequency of the control tone frequency band, in the frequency measuring circuit 54 by comparing the signal of the discriminator 48 with a reference frequency indicative of the correct frequency of the calibrate tone. This comparison produces a frequency error signal in the form of a frequency correction voltage. The frequency measuring circuit 54 is connected to the frequency compensation circuit 56 to provide the frequency compensation circuit 56 with the frequency error signal, in the preferred embodiment a voltage, indicating the amount of compensation needed due to detuning or drift. The above frequency error determination can be implemented using software techniques.

The frequency compensation unit receives the frequency correction voltage and uses it to frequency shift the combination information signal thereby correcting the frequencies of the compressed speech signal and ultimately the recovered speech signal as well as the control tone. In one embodiment of FIG. 5, the frequency compensation unit 56 is similar to that disclosed in FIG. 8(a). In this embodiment, the frequency compensation unit 56 phase shifts the incoming signal by using Hilbert Transform Circuit 201 and multiplies, by using multipliers 203 and 207, split portions of the received signal by a cosine or a sine signal.

With respect to the transmission of data, the Lincompex techniques used may or may not be different from the transmission of voice signals due to the complex nature of the data waveform. This technique is fully discussed in the co-pending application, now U.S. Pat. No. 4,907,217, to the Inventor of this application, but will be briefly described below.

Figure 2B:
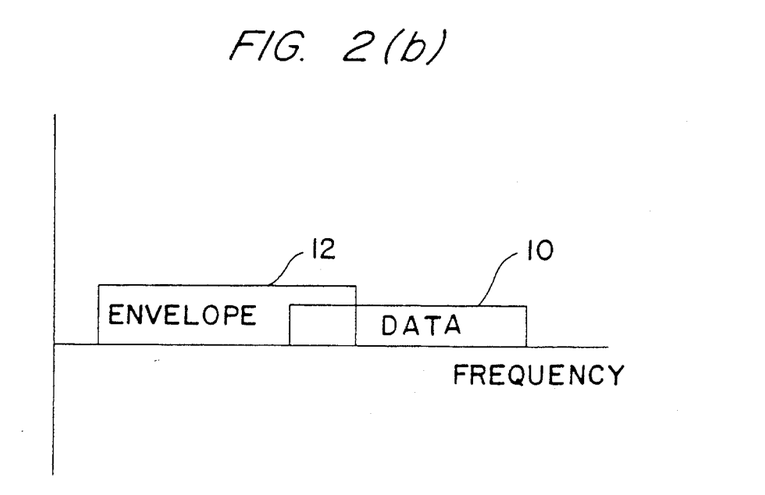

As described in the Leveque co-pending application, now U.S. Pat. No. 4,907,217, a data signal is digitally transmitted using Lincompex techniques. This problem associated with transmission of such data signal arises from the frequency band overlap occurring within such a complex waveform as shown in FIG. 2(b) where the data signal overlaps the envelope. An example of such a system is now explained with reference to FIGS. 4(a) and 4(b).

Figure 4A:
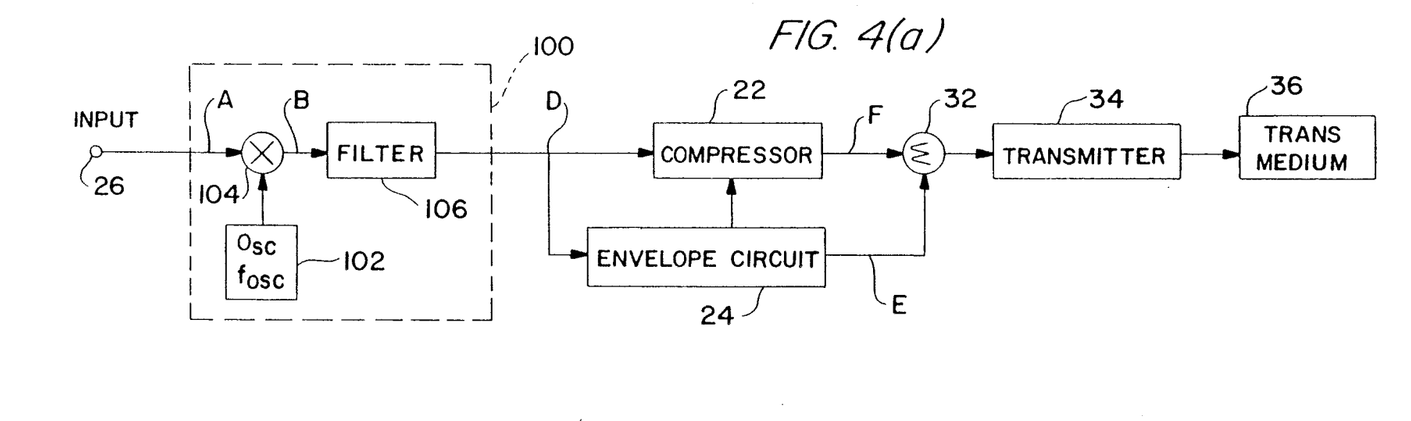
FIGS. 4(a) and 4(b) illustrate the transmitter and receiver sections of a conventional Lincompex system used to transmit data (complex waveforms)
Figure 4B:
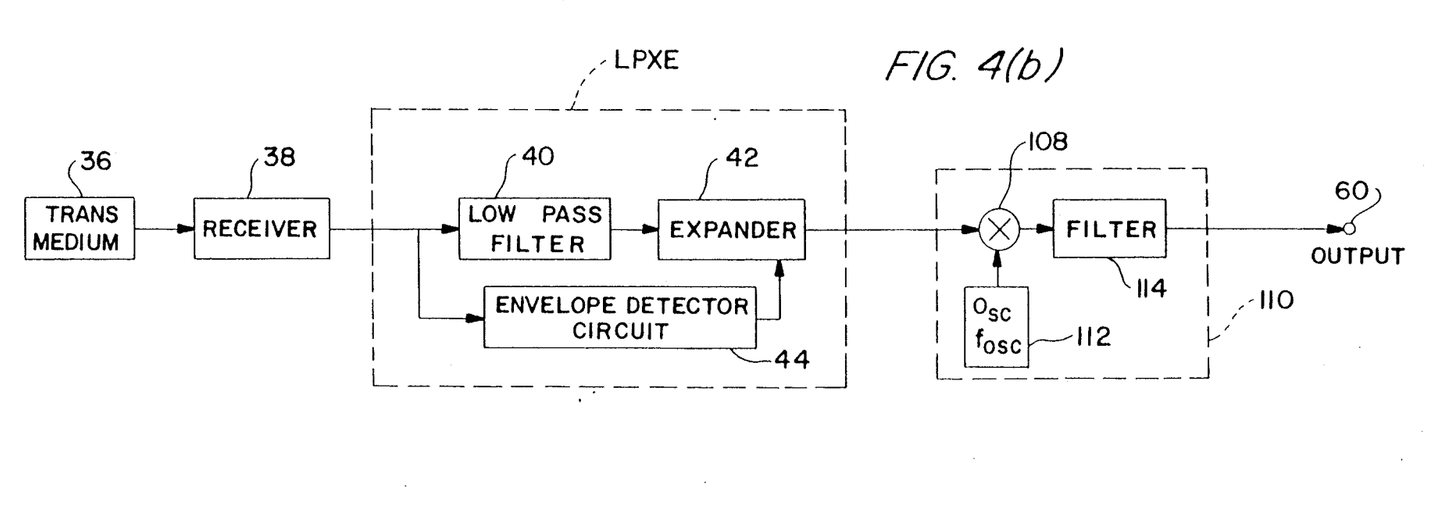

FIGS. 4(a) and 4(b) illustrate collectively a Lincompex System where the input signal is frequency shifted prior to the compression/expansion operation to enable transmission of a wideband complex waveform using Lincompex techniques. FIGS. 4(a) and 4(b) will be described with reference to the frequency spectra illustrated in FIGS. 7(a)-(f). In FIGS. 4(a) and 4(b), as in all of the figures of the present invention, like elements throughout the drawing figures are identified with like numbers.

Figure 7A:
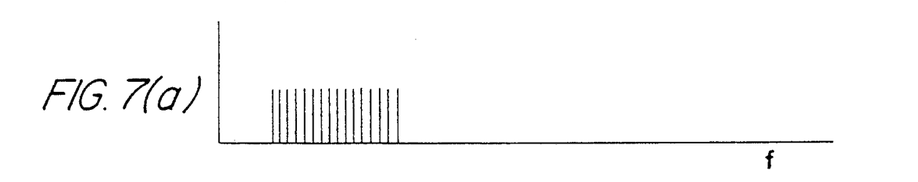
FIG. 7(a)-7(f) illustrate the frequency spectrum of the data signal transmitted using conventional Lincompex techniques.
Figure 7B:
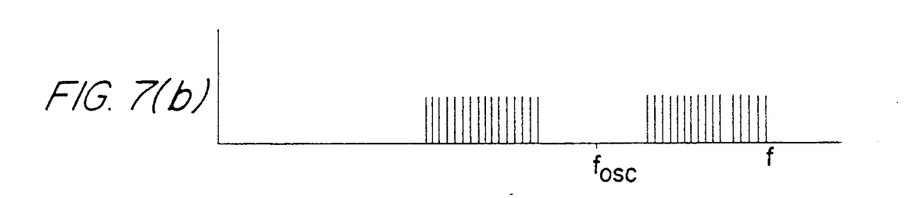

Whereas the FIG. 1(a) prior art Lincompex system normally receives speech or voice at its input 20, the embodiment of FIG. 4(a) would normally receive a data input such as a 16-tone parallel-tone or multi-tone data signal as illustrated in FIG. 7(a) at its input 20. However, it should be understood that any complex data waveform including voice may be transmitted over a communications channel.

Figure 7C:
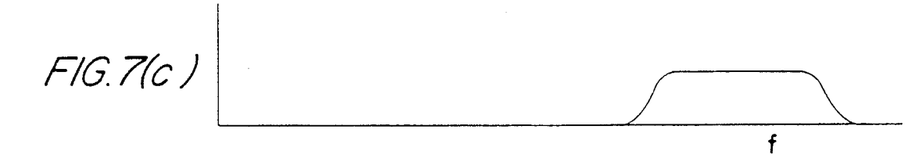
Figure 7D:
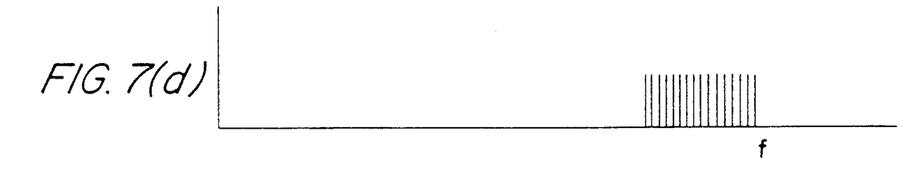
Figure 7E:
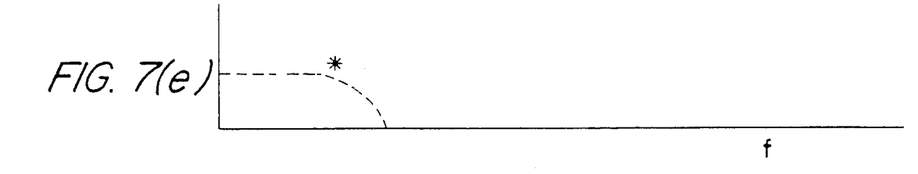
Figure 7F:
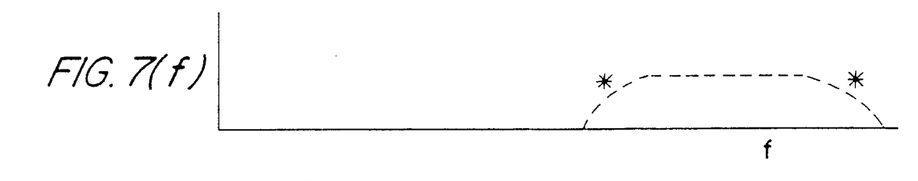

A mixer 100 is provided to frequency shift the input data frequency spectra showing FIG. 7(a), to a desired higher frequency $F_{osc}$ to ensure that no overlap between the input data band, when compressed, and the envelope signal frequency band occurs. Accordingly, an oscillator 102 supplies the mixing frequency $F_{osc}$ to a frequency multiplier or mixer 104 where it is mixed with the data input A of FIG. 7(a) to produce the mixed data B of FIG. 7(b). A filter 106 is then provided to band pass filter the mixed output to remove an undesired one of the two side bands produced by the mixing process. The frequency response of the filter 106 is illustrated in FIG. 7(c). After filtering, only a single side band is left which is frequency shifted to a desired frequency at the output D of the filter 106 as illustrated in FIG. 7(d). This frequency shifted data input of FIG. 7(d) is then treated by conventional Lincompex techniques by a compressor 22, envelope circuit 24, summer 32 and transmitter 34, in the manner described with respect to FIG. 1 to produce a combined data signal for transmission in the transmission medium 36. As explained previously, the compression operation enlarges the frequency spectrum of the compressed data as shown in FIG. 7(f). The envelope circuit 24 generates an envelope spectrum E which would have a selected bandwidth depending on various factors including the accuracy of compression to be achieved. However, it is important that the bandwidth of the envelope spectrum not overlap that of the compressed data so that full compression and recovery of the data can be accomplished by the Lincompex system.

A receiver 38 is positioned at the other end of the transmission medium 36 as illustrated in FIG. 4(b) in a like manner to that of the prior art of FIG. 1(b). The modulated combined data signal is demodulated by the receiver 38 and a Lincompex expander LPXE including a low pass filter 40, expander 42, and envelope detector 44 recovers the frequency shifted data input first generated at point D of FIG. 4(a) as illustrated in FIG. 7(d) at the output of the expander 42. This frequency shifted data input, while not identical to the original data input signal delivered to the input 20 of FIG. 4(a) is nevertheless utilizable to recover the data contained therein. Accordingly, if desired, this frequency shifted data input may be provided via a line to an output where it may be detected by a detector sensitive to the frequency shifted tones contained within the frequency shifted data input. Alternatively, a receiver mixer 110 including a multiplier 108, frequency oscillator 112 and filter 114 may be utilized to shift the frequency shifted data input back to its original frequency band as illustrated in FIG. 7(a) in a manner similar to the operation of the mixer 100 of FIG. 4(a). Accordingly, the digital information may be readily recovered.

Figure 6:
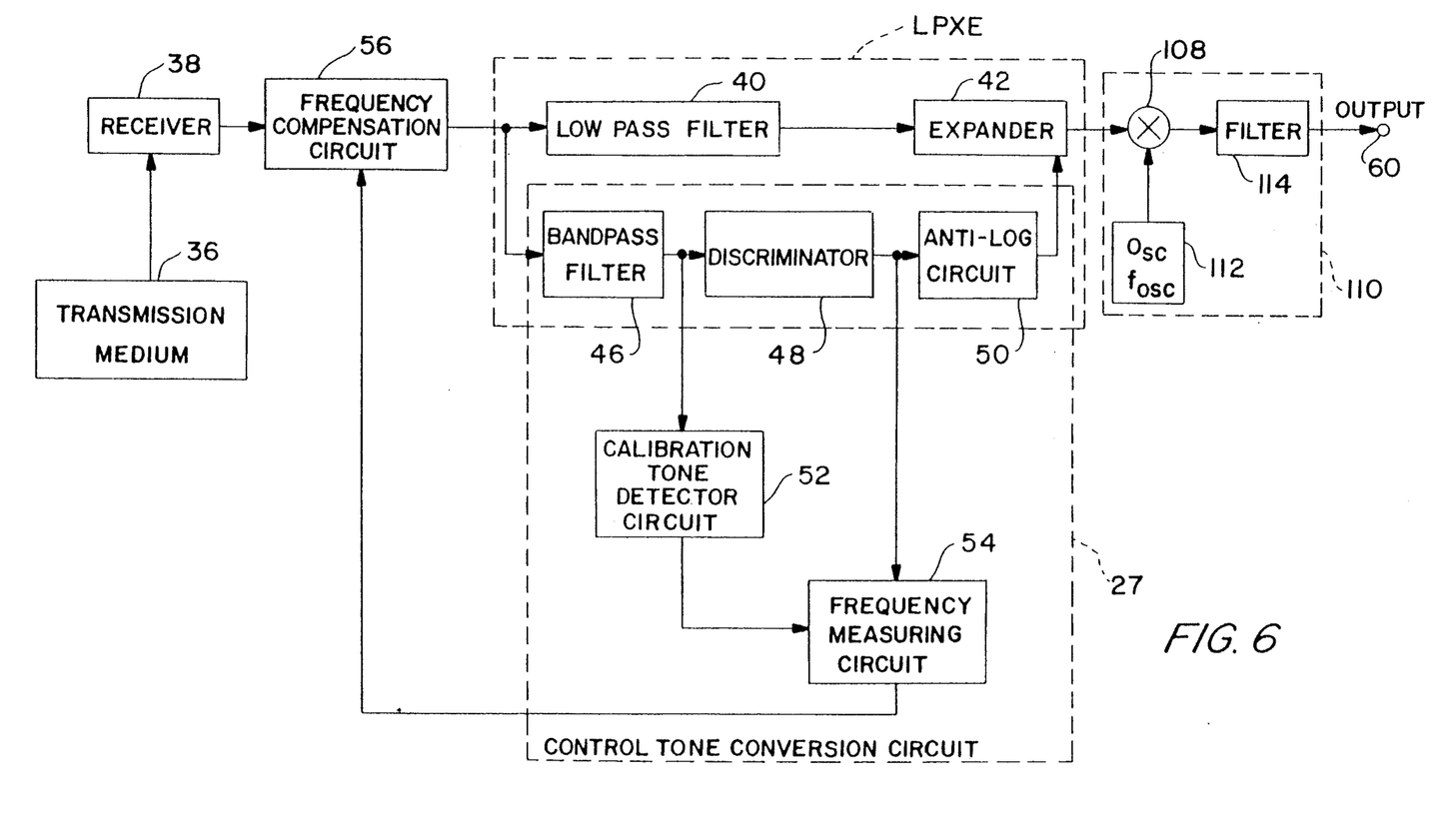
FIG. 6 illustrates one embodiment of a Lincompex receiver produced according to the teaching of the present invention with respect to the transmission/reception of a complex waveform (data signal)

FIG. 6 illustrates one preferred embodiment of the present invention where the Lincompex demodulator automatically frequency compensates the compressed complex waveform by frequency shifting the total bandwidth according to a measured frequency error prior to the splitting of the complex waveform into its components, a data signal and a control tone, thereby substantially eliminating data distortion due to frequency drift or the detuning of the transmitter/receiver system. In FIG. 6, as in all figures of the present application, like elements throughout the drawing figures are identified with like numbers.

The demodulator/receiver of FIG. 6 receives a complex waveform transmitted by a Lincompex transmitter as illustrated in FIG. 4(a) of the present application. This demodulator includes a receiver 38 which receives the transmitted modulated signal (complex waveform) from the transmission medium 36. The modulated combined data signal is demodulated by the receiver 38 and a Lincompex expander LPXE which includes a low pass filter 40, an expander 42, and an envelope detector circuit 44 As discussed with respect to FIG. 4(a), the transmitted complex waveform is frequency shifted to allow the detection of the envelope band without overlap of the data band. This frequency shifted transmitted data signal is recovered by the LPXE circuit. However, to ensure proper reception of the databand, the frequency shifted data signal recovered by the LPXE needs to be frequency shifted back to its original frequency. This is accomplished by feeding the recovered data signal through a receiver mixer 110 which includes a multiplier 108, a frequency oscillator 112, and filter 114. This receiver mixer 110 shifts the frequency shifted data input back to its original frequency band as illustrated in FIG. 7(a).

FIG. 6 also includes a frequency compensation circuit 56 positioned between the receiver 38 and the LPXE. This frequency compensation circuit 56 is connected to the frequency measuring circuit 54 of the control tone conversion circuit 27 which provides the frequency compensation circuit 56 with a frequency error signal. In response to this frequency error signal, the frequency compensation circuit 56 frequency shifts the complex waveform received from the receiver 38 to compensate for frequency drift or the detuning of the transmitter/receiver system. The frequency compensation circuit operates in a manner similar to the frequency compensation circuit 56 of FIG. 5.

The frequency compensation and calibration techniques of the present invention may be used in any of the data embodiments disclosed in the co-pending Leveque application now U.S. Pat. No. 4,907,217. Placement of the frequency compensation circuit 56 may be placed in such preferred embodiments anywhere between the receiver 38 and the low pass filter 40, and bandpass filter 46 used to separate the compressed combination information waveform from the control tone. An alternative to utilization of such a frequency compensation circuit might be to directly vary the oscillator frequency of the receiver 38 through utilization of a voltage controlled oscillator or the like therein directly responsive to the output of the frequency measurement circuit 54. While the output of the frequency measurement circuit 54 in the preferred embodiment is a voltage, any other suitable designation or variation of the received calibration tone frequency from the expected calibration tone frequency may be utilized to vary the frequency of the receiver oscillator or one of the oscillators within the frequency compensation circuit. The same modification could of course be made to the speech Lincompex transmission system of FIG. 5.

OPERATION OF THE PRESENT INVENTION

In operation, with reference to FIG. 5, a transmitter, similar to the transmitter shown in FIG. 1(a), transmits a compressed combination information waveform having a voice signal and a control tone. This waveform is usually transmitted over a certain channel frequency to which a receiver is tuned. The transmission medium 36 utilized in the present invention may be any type of transmission medium, for example, an atmospheric radio wavelength, a telephone line, coaxial cable or fiberoptic cable, or any other path usable for the transmission of the selected combination information waveform such as voice or data. Also, the two components of the compressed combination information waveform can be sent via two separate transmission mediums.

In a preferred embodiment of the present invention, the present invention receives the compressed voice signal and control tone transmitted by the transmitter and expands the voice signal according to extracted control tone information. This expanded voice signal is outputted to recover the original analog voice waveform inputted into the transmitter.

To achieve this result, the received analog complex waveform is digitized to 8,000 samples per second after anti-aliasing filtering. This digitalized signal is passed through a digital low pass filter 40 which selects only the compressed voice portion (signal) of the combination information waveform. The compressed voice portion (signal) is then gain controlled by a fading regulator 58. This fading regulator 58 complements the receiver's automatic gain control process by removing audio level variations, not removed initially by the receiver, in a slowly varying transmission channel. The compressed voice signal is then multiplied in the expander 42 by a recovered envelope estimate. This multiplication process expands the compressed voice signal to reproduce a digital waveform which represents the original voice waveform. This digital waveform can be converted to an analog waveform by conventional methods.

To accomplish the expansion process, the recovered envelope estimate must be determined from the control tone. The control tone is separated from the combination information waveform by the bandpass filter 46. This bandpass filtered waveform is passed through the discriminator 48 to determine the control tone's frequency. This frequency determination is transformed in a voltage level representative of the measured frequency. This voltage level is transformed by an exponentiation function, an anti-log function in the anti-log circuit 50, to obtain the recovered envelope estimate used by the expander 42.

The present invention also compensates the frequency of the control tone to substantially eliminate any power variation in the recovered voice signal. With respect to this aspect of the present invention, a burst pattern of a constant frequency calibration tone is transmitted by the transmitter at the beginning of each transmission, for example. This burst of the calibration tone is received by the receiver and passed through the bandpass filter 46 as if it were a regularly transmitted control tone. After passing through bandpass filter 46, the calibration tone is detected by the calibration tone detector circuit 52 in a manner similar to the calibration tone detecting method described in the Leveque '499 Patent. The calibration tone detector circuit 52 produces an enabling signal upon detecting a calibration tone. This enabling signal is monitored by the frequency measuring circuit 54.

In response to this enabling signal, the frequency measuring circuit 54 produces a frequency error signal for controlling the operation of the frequency compensation circuit 56 or to retune the receiver 38. The frequency error signal is determined by comparison of the frequency of the calibration tone with a reference frequency which is the control tone center frequency. If a difference is detected, the frequency error signal is produced in such a manner that it represents the difference between the frequencies. Thus, the frequency error signal represents a measured frequency error in the received signal due to detuning or drifting of the transmitter and/or receiver In response to the frequency error signal produced by the frequency measuring circuit 54, the frequency compensation circuit 56 frequency shifts the bandwidth of the received combination information waveform. This is accomplished by a frequency shifting or frequency translation process. An example of such a frequency compensation circuit is shown in FIG. 3(*b*). Such methods of frequency compensation are readily known in the art.

The present invention is also able to compensate the frequency of the voice signal to substantially eliminate "duck-talk" from the produced voice signal. This is achieved by connecting the frequency compensation circuit 56 in series with the receiver and both the low pass filter 40 and the bandpass filter 46. Thus, the frequency compensation circuit 56 frequency shifts the total bandwidth of the combination information waveform not just the bandwidth associated with the control tone as in the conventional device of FIG. 3. This frequency shifting of the total bandwidth compensates the frequency of the whole combination information waveform to match the communication channel theoretical frequency, thereby substantially eliminating single sideband "duck-talk" due to mistuned or drifting equipment.

The operations of FIG. 6 are basically the same as FIG. 5 except that the data signal is frequency compensated instead of the voice signal of FIG. 5. Also, FIG. 6 illustrates that the recovered data signal is further frequency shifted by the receiver mixer 110 to frequency shift the data signal back to its original frequency from which it was shifted upon transmission to avoid overlap with the control tone, thereby allowing the transmission of a complex waveform without encountering data distortion due to frequency drift or the detuning of the transmitter/receiver system.

It is also contemplated by the present invention that the frequency compensation circuit 56 be utilized in connection with the receiver 38. In this embodiment, the received signal is frequency compensated during the demodulation process. The receiver would have an external input for controlling tuning, such as a digital interface, which would be controlled by the frequency measuring circuit 54 and the frequency compensation circuit 56. For example, the frequency used in the demodulation process can be altered to compensate for the detected frequency error using the voltage control methods described above.

It is further contemplated by the present invention that the frequency compensation process be accomplished by the receiver mixer 110 in the data transmission system. Since this mixer 110 already incorporates a frequency shifting process, one frequency oscillator could be readily replaced with a voltage controlled oscillator which would compensate for the initial frequency shift by the transmitter so that a complex waveform could be transmitted and would also compensate for the detected frequency drift or the detuning of the transmitter/receiver system.

From the above-described preferred embodiments, it is apparent that Lincompex techniques may be utilized to transmit combination information waveforms including either voice or data without exhibiting the problem of carrier drift causing so called "duck-talk" in a voice signal, and distortion during the transmission of a data signal or other complex waveform. The frequency shifting operation of the frequency compensation circuit, according to the teachings of the present invention, are performed upon the whole combination information waveform within the communication channel. By including the whole combination information waveform in the frequency compensation process, a voice signal can be modified to prevent the "duck-talk" phenomena and a data signal can be free of distortion.

From the above-described embodiments of the present invention, it is apparent that the present invention may be modified as would occur to one of ordinary skill in the art without departing from the spirit and scope of the present invention which should be defined solely by the appended claims. Changes and modifications of the system contemplated by the present preferred embodiments will be apparent to one of ordinary skill in the art.

What is claimed is:

1. A method for receiving a compressed combination information waveform transmitted over a communication channel, wherein a transmitter transmits a calibration tone independently recognizable from the transmitted compressed combination information waveform, the combination information waveform including a compressed voice signal and an envelope signal represented by a control tone, comprising the steps of:
  (a) receiving the calibration tone;
  (b) determining a frequency of the calibration tone;
  (c) separating the compressed combination information waveform into the compressed voice signal and the control tone;
  (d) determining a frequency of the control tone;
  (e) expanding the compressed voice signal by multiplying the compressed voice signal by the frequency of the control tone determined in said step (d);
  (f) determining a frequency error by comparing the frequency of the calibration tone determined in said step (b) with a reference frequency; and
  (g) frequency compensating the compressed combination information waveform prior to the execution of said step (c) according to the frequency error determined in said step (f) such that both the compressed voice and control tone of said step (c) are frequency compensated, thereby substantially eliminating "duck-talk".

2. The method as claimed in claim 1 further comprising the step of:
  (h) detecting the calibration tone.

3. The method as claimed in claim 1, further comprising the step of:
  (h) compensating the compressed voice signal for a slowly varying transmission channel prior to the execution of said step (e).

4. The method as claimed in claim 1 wherein said step (c) comprises the steps of:
  (h) digital low pass filtering of the compressed combination information waveform to produce the compressed voice signal; and
  (i) bandpass filtering of the compressed combination information waveform to produce the control tone.

5. The method as claimed in claim 1 wherein said step (d) comprises the steps of:
  (h) determining the frequency of the control tone;
  (i) Producing a signal corresponding to the frequency of the control tone determined in said step (h);
  (j) calculating an anti-log function of the signal produced in said step (i); and
  (k) producing a frequency signal corresponding to the calculations carried out in said step (h).

6. The method as claimed in claim 2, further comprising the steps of:
  (h) producing an enabling signal representing the detection of the calibration tone, the enabling signal allowing the execution of said step (f);

7. The method as claimed in claim 1, wherein said step (g) comprises the step of:
  (h) frequency shifting a total bandwidth of a whole communication channel according to the frequency error determined in said step (f).

8. A method for receiving a complex waveform transmitted over a communication channel, wherein a transmitter transmits a calibration tone independently recognizable from the transmitting complex waveform, the complex waveform including a compressed data signal and an envelope signal represented by a control tone, the complex waveform being frequency shifted in the transmitter prior to transmission to eliminate overlap between the compressed data signal and the envelope signal, comprising the steps of:
  (a) receiving the calibration tone;
  (b) determining a frequency of the calibration tone;
  (c) separating the compressed data signal from the control tone;
  (d) determining a frequency of the control tone;
  (e) expanding the compressed data signal by multiplying the compressed data signal by a frequency signal corresponding to the frequency of the control tone determined in said step (d);
  (f) frequency shifting the expanded data signal produced in said step (e) to compensate for the frequency operations carried out in the transmitter;
  (g) determining a frequency error by comparing the frequency of the calibration tone determined in said step (b) with a reference frequency representing a control tone frequency; and
  (h) frequency compensating the complex waveform prior to the execution of said step (c) according to the frequency error determined in said step (g) such that both the compressed data signal and control tone of said step (c) are frequency compensated, thereby substantially eliminating data distortion due to frequency drift or detuning.

9. The method as claimed in claim 8, further comprising the step of:
  (i) detecting the calibration tone.

10. The method as claimed in claim 8, wherein said step (c) comprises the steps of:
  (i) digital low pass filtering of the compressed complex waveform to produce the compressed data signal; and
  (j) bandpass filtering of the compressed complex waveform to produce the control tone.

11. The method as claimed in claim 8, wherein said step (d) comprises the steps of:
  (i) determining the frequency of the control tone;
  (j) producing a signal corresponding to the frequency of the control tone determined in said step (i);
  (k) calculating an anti-log function of the signal produced in said step (j); and
  (l) producing the frequency signal representing a frequency of the envelope signal corresponding to the calculations carried out in said step (k)

12. The methods as claimed in claim 9, further comprising the step of:
  (i) producing an enabling signal representing the detection of the calibration tone, the enabling signal allowing the execution of said step (g);

13. The method as claimed in claim 8, wherein said step (h) comprises the step of:
  (i) frequency shifting a total bandwidth of a whole communication channel according to the frequency error determined in said step (g).

14. A demodulator for receiving a compressed combination information waveform including a compressed voice signal and control tone transmitted over a communication channel, comprising:
  filter means for separating the compressed combination information waveform into the compressed voice signal and the control tone;
  expanding means, operatively connected to said filter means, for expanding the compressed voice signal into a waveform representing an original signal prior to compression and for determining a frequency error in a frequency of the compressed combination information waveform received by the demodulator; and frequency compensation means, operatively connected to said filter means and said expanding means, for frequency compensating the compressed combination information waveform according to said frequency error such that the compressed voice signal and control tone are frequency compensated;

said frequency compensation means compensating the compressed combination information waveform before the compressed combination information waveform is introduced to said filter means.

15. The demodulator as claimed in claim 14, wherein the filter means comprises:
    low pass filter means for separating the compressed voice signal from the compressed combination information waveform; and
    bandpass filter means for separating the control tone from the compressed combination waveform.

16. The demodulator as claimed in claim 14, wherein said expanding means comprises:
    fading means, operatively connected to said filter means to receive the compressed voice signal, for removing audio level variations in a slowly varying transmission channel;
    discriminating means, operatively connected to said filter means to receive the control tone, for determining a frequency of the control tone and for producing a first signal representing said frequency of the control tone;
    anti-log means, operatively to said discriminating means, for determining an anti-log of said frequency determined by said discriminating to produce a frequency signal representing a frequency of an estimate envelope;
    expander means, operatively connected to said fading means and said anti-log means, for multiplying the compressed voice signal by said frequency signal to produce said original voice signal;
    calibration tone detection means, operatively connected to said filter means, for detecting a burst of a calibration tone and for producing an enabling signal according to the detection of the calibration tone, said burst of said calibration tone being produced by a transmitter prior to a transmission of the combination information waveform; and
    frequency measuring means, operatively connected to said discriminating means and said calibration tone detector means, for producing a frequency error signal representing said frequency error when said enabling signal is received.

17. The demodulator as claimed in claim 16, wherein said frequency measuring means compares said first signal from said discriminating means with a reference frequency to determine said frequency error.

18. The demodulator as claimed in claim 14, wherein said frequency compensation means comprises:
    frequency shifting means for frequency shifting a total bandwidth of a whole communication channel in response to said frequency error.

19. A demodulator for receiving a compressed combination information waveform including a compressed voice signal and a control tone over a communication channel, comprising:
    low pass filter means, for separating the compressed voice signal from the compressed combination information waveform;
    bandpass filter means, for separating the control tone from the compressed combination information waveform;
    estimate envelope frequency determining means, operatively connected to said bandpass filter means, for producing a frequency signal representing a frequency of an envelope of the combination information waveform;
    expanding means, operatively connected to said low pass filter means and said estimate envelope frequency determining means, for expanding the compressed voice signal to an original voice signal; and
    compensating means, operatively connected to said low pass filter, said bandpass filter, and said estimate envelope frequency determining means, for determining a frequency error in the compressed combination information waveform and for correcting a frequency of the compressed combination information waveform prior to the compressed complex waveform being introduced to said low pass filter means according to said frequency error.

20. The demodulator as claimed in claim 19, wherein said compensating means corrects said frequency of the compressed combination information waveform prior to the compressed combination information waveform being introduced to said bandpass filter means.

21. The demodulator as claimed in claim 19, wherein said expanding means comprises:
    fading means, operatively connected to said low pass filter means, for removing audio level variations in a slowly varying transmission channel; and
    expander means, operatively connected to said fading means and said estimate envelope frequency determining means, for multiplying the compressed voice signal by said frequency signal to produce said original voice signal.

22. The demodulator as claimed in claim 19, wherein said estimate envelope frequency determining means comprises:
    discriminating means, operatively connected to said bandpass filter means, for determining a frequency of the control tone; and
    anti-log means, operatively connected to said discriminating means and said expanding means, for producing said frequency signal according to an anti-log calculation of said frequency of the control tone.

23. The demodulator as claimed in claim 19, wherein said compensating means comprises:
    calibration tone detection means, operatively connected to said bandpass filter means, for detecting a burst of a calibration tone and for producing an enabling signal representing the detection of said calibration tone, said burst of said calibration tone being produced by a transmitter prior to a transmission of the combination information waveform;
    said estimate envelope frequency determining means producing a signal representing a frequency of the calibration tone;
    frequency measuring means, operatively connected to said calibration tone detector means and said estimate envelope frequency determining means, for determining said frequency error when said enabling signal is present by comparing said frequency of the calibration tone with a reference frequency and for producing a frequency error signal representing said frequency error; and frequency shifting means, operatively connected to said low pass filter means, bandpass filter means and said frequency measuring means, for frequency shifting a total bandwidth of a whole communication channel according to said frequency error signal.

24. A demodulator for receiving a compressed complex waveform including a data signal and a control tone transmitted over a communication channel, comprising:

filter means for separating the compressed complex waveform into the compressed data signal and the control tone;

expanding means, operatively connected to said filter means, for expanding the compressed data signal into a waveform representing an original data signal prior to compression and for determining a frequency error in a frequency of the compressed complex waveform received by the receiver; and frequency compensation means, operatively connected to said filter means and said expanding means, for frequency compensating the compressed complex waveform according to said frequency error such that the compressed data signal and control tone are frequency compensated;

said frequency compensation means compensating the compressed complex waveform before the compressed complex waveform is introduced to said filter means.

25. The demodulator as claimed in claim 24, wherein said filter means comprises:

low pass filter means for separating the compressed data signal from the compressed complex waveform; and bandpass filter means for separating the control tone from the compressed complex waveform.

26. The demodulator as claimed in claim 24, further comprising:

frequency shifting means, operatively connected to said expanding means, for frequency shifting the expanded data signal back to an original frequency, the data signal being frequency shifted by a transmitter prior to transmission to prevent overlap of the compressed data signal and control tone.

27. The demodulator as claimed in claim 24, wherein said expanding means comprises:

discriminating means, operatively, connected to said filter means, for determining a frequency of the control tone and for producing a first signal representing said frequency of the control tone;

anti-log means, operatively to said discriminating means, for determining an anti-log of said first signal produced by said discriminating to produce a frequency signal representing a frequency of an estimate envelope;

expander means, operatively connected to said filter means and said anti-log means, for multiplying said compressed data signal by said frequency signal to produce said original data signal;

calibration tone detection means, operatively connected to said filter means, for detecting a burst of a calibration tone and for producing an enabling signal according to the detection of the calibration tone, said calibration tone being produced by a transmitter prior to transmission of the complex waveform; and frequency measuring means, operatively connected to said discriminating means and said calibration tone detector means, for producing a frequency error signal representing said frequency error when said enabling signal is received by comparing said frequency of the calibration tone with a reference frequency 28. The demodulator as claimed in claim 24, wherein said frequency compensation means comprises:

frequency shifting means for frequency shifting a total bandwidth of a whole communication channel in response to said frequency error.

29. A demodulator for receiving a compressed complex waveform including a compressed data signal and control tone over a communication channel, comprising:

low pass filter means, for separating the compressed data signal from the compressed complex waveform;

bandpass filter means, for separating the control tone from the compressed complex waveform;

estimate envelope frequency determining means, operatively connected to said bandpass filter means, for producing a frequency signal representing a frequency of an envelope of the complex waveform;

expanding means, operatively connected to said low pass filter means and said estimate envelope frequency determining means, for expanding said compressed data signal to an original data signal; and compensating means, operatively connected to said low pass filter, said bandpass filter, and said estimate envelope frequency determining means, for determining a frequency error in the compressed complex waveform and for correcting a frequency of the compressed complex waveform prior to the compressed complex waveform being introduced to said low pass filter means according to said frequency error.

30. The demodulator as claimed in claim 29, wherein said compensating means corrects said frequency of the compressed complex waveform prior to the compressed complex waveform being introduced to said bandpass filter means.

31. The demodulator as claimed in claim 29, further comprising:

frequency shifting means, operatively connected to said expanding means, for frequency shifting the expanded data signal back to an original frequency, the data signal being frequency shifted by a transmitter prior to transmission to prevent overlap of the compressed data signal and control tone.

32. The demodulator as claimed in claim 29, wherein said expanding means comprises:

expander means, operatively connected to said low pass filter means and said estimate envelope frequency determining means, for multiplying said compressed data signal by said frequency signal to produce said original data signal.

33. The demodulator as claimed in claim 29, wherein said estimate envelope frequency determining means comprises:

discriminating means, operatively connected to said bandpass filter means, for producing a first signal representing a frequency of the control tone; and anti-log means, operatively connected to said discriminating means and said expanding means for producing said frequency signal according to an anti-log calculation of said first signal 34. The demodulator as claimed in claim 33, wherein said compensating means comprises:
- calibration tone detection means, operatively connected to said bandpass filter means, for detecting a burst of a calibration tone and for producing an enabling signal representing the detection of said calibration tone, said burst of said calibration tone being produced by a transmitter prior to transmission of the complex waveform;
- frequency measuring means, operatively connected to said calibration tone detector means and said discriminating means, for determining said frequency error when said enabling signal is present by comparing said frequency of the calibration tone with a reference frequency and for producing a frequency error signal representing said frequency error; and
- frequency shifting means, operatively connected to said low pass filter means, bandpass filter means and said frequency measuring means, for frequency shifting a total bandwidth of a whole communication channel according to said frequency error signal.

35. A method for synchronizing a transmitter and a demodulator to be used in a transmission of a compressed waveform utilizing Lincompex techniques, comprising the steps of:
  (a) transmitting a calibration tone prior to transmitting the compressed waveform;
  (b) detecting the calibration tone in the demodulator;
  (c) determining a frequency of the calibration tone;
  (d) determining an error between the calibration tone frequency received by the demodulator and the correct calibrate tone frequency to develop a frequency error signal; and
  (e) frequency compensating the compressed waveform at the demodulator by frequency shifting according to the frequency error represented by the frequency error signal.

36. The method as claimed in claim 35, wherein said compressed signal is a voice signal 37. The method as claimed in claim 35, wherein said compressed signal is a data signal.

38. The method as claimed in claim 35, further comprising the steps of:
  (f) separating the compressed waveform into a compressed signal and a control tone;
  (g) determining a frequency of the control tone; and
  (h) expanding the compressed signal according to the determined frequency of the control tone.

39. A demodulator for receiving a compressed waveform utilizing Lincompex techniques, comprising:
- calibration tone detector means for detecting a calibration tone transmitted by a transmitter;
- frequency determining means, operatively connected to said calibration tone detector means, for determining a frequency of said calibration tone;
- frequency error means, operatively connected to said frequency determining means, for determining a frequency error according to a difference between said frequency of said calibration tone and a reference frequency; and
- compensating means, operatively connected to said frequency error means, for frequency compensating the compressed waveform according to said frequency error.

40. The demodulator as claimed in claim 39, wherein said frequency error means is operatively connected to said calibration tone detector means
  said frequency error means determining said frequency of said calibration one only when said calibration tone detector means detects said calibration tone.

41. The demodulator as claimed in claim 39, further comprising:
- low pass filter means, operatively connected to said compensating means, for separating a compressed signal from the compressed waveform;
- bandpass filter means, operatively connected to said compensating means, for separating a control tone from the compressed signal;
- said frequency determining means, operatively connected to said bandpass filter means, determining a frequency of said control tone; and
- expanding means, operatively connected to said low pass filter means and said frequency determining means, for expanding said compressed signal into an expanded signal.

42. The demodulator as claimed in claim 41, wherein said compressed signal is a voice signal.

43. The demodulator as claimed in claim 41, wherein said compressed signal is a data signal.

44. The demodulator as claimed in claim 43, further comprising:
- frequency shifting means, operatively connected to said expanding means, for frequency shifting said expanded signal into an original signal to compensate for frequency shifting in the transmitter to prevent data and envelope overlap prior to transmission.

* * * * *